United States Patent [19]

Ohsaki

[11] Patent Number: 5,416,763
[45] Date of Patent: May 16, 1995

[54] LOADING MECHANISM FOR OPTICAL DISK PLAYER

[75] Inventor: Kiyoshi Ohsaki, Tokyo, Japan

[73] Assignee: Kabushiki Kaisha Kenwood, Tokyo, Japan

[21] Appl. No.: 19,692

[22] Filed: Feb. 19, 1993

[30] Foreign Application Priority Data

Feb. 25, 1992 [JP]  Japan .................................. 4-073361

[51] Int. Cl.[6] ........................ G11B 33/02; G11B 23/00
[52] U.S. Cl. .................................. 369/77.1; 369/75.2; 369/270
[58] Field of Search .................... 369/77.1, 75.2, 219, 369/204, 233, 270, 271; 360/99.03, 99.07

[56] References Cited

U.S. PATENT DOCUMENTS

| 4,928,271 | 5/1990 | Verhagen | 369/291 |
| 5,031,169 | 7/1991 | Kato et al. | 369/77.1 |
| 5,097,460 | 3/1992 | Camps et al. | 369/77.1 |
| 5,166,917 | 11/1992 | Decoster et al. | 369/77.1 |

FOREIGN PATENT DOCUMENTS

| 0434133 | 6/1991 | European Pat. Off. | |
| 4006585 | 6/1990 | Germany | |
| 59-195377 | 6/1984 | Japan | |
| 60-101762 | 5/1985 | Japan | |
| 3022246 | 1/1991 | Japan | |
| 3022261 | 1/1991 | Japan | |
| 2218254 | 8/1989 | United Kingdom | 369/75.2 |

Primary Examiner—Stuart S. Levy
Assistant Examiner—David D. Davis
Attorney, Agent, or Firm—Sixbey, Friedman, Leedom & Ferguson; Gerald J. Ferguson, Jr.; Evan R. Smith

[57] ABSTRACT

A loading completion of small and large diameter disks is mechanically controlled to provide a mechanical control of clamping operation and the like. An elongated hole of a third arm with a pin engagable with an elongated hole formed in a chassis couples with a pin mounted on a second arm. As a large diameter disk is loaded, the motion of the second arm is transmitted via the third arm to a slider. As a small diameter disk is loaded, the small diameter disk pushes a pin mounted on the third arm to rotate the third arm. The motion of the third arm is transmitted to the slider. The motion of the slider activates a power transmission mechanism which transmits power of the loading motor to a disk clamping mechanism and a driving mechanism for driving a loading roller supporting lever.

4 Claims, 5 Drawing Sheets

LOADING MECHANISM FOR OPTICAL DISK PLAYER

BACKGROUND OF THE INVENTION

1. Field of the Invention

The present invention relates to a loading mechanism for optical disk players. More particularly, the invention relates to a loading mechanism for optical disk players capable of controlling the clamp operation and the like by mechanically detecting the circumferential edges of both large and small diameter disks.

2. Description of the Related Art

A conventional loading mechanism for an optical disk player of the type that can play optical disks of both large (12 cm CD) and small (8 cm CD) diameters detects a loading completion of a disk by using optical sensors or micro switches whose output signals are checked by a microcomputer to activate electromagnetic plungers and control the mechanical drive unit.

Such a conventional loading mechanism requires expensive optical end sensors, electromagnetic plungers, and associated circuit components, resulting in a high cost of the mechanism.

Furthermore, many additional operations to be controlled by the microcomputer become necessary, complicating software.

SUMMARY OF THE INVENTION

The present invention solves the above-described problems. It is an object of the present invention to provide a loading mechanism for optical disk players capable of mechanically controlling the clamp operation and the like by detecting the circumferential edges of both large and small diameter disks.

According to an aspect of the present invention, in a loading mechanism for an optical disk player wherein first arms each having a pin extending toward a motion path of a large diameter disk are rotatably and symmetrically mounted on a chassis and biased by a spring, second arms each having a disk position aligning pin extending toward motion paths of the large diameter disk and a small diameter disk are rotatably and symmetrically mounted on the chassis and biased by a spring, and the disk position aligning pins determine the position of one of the large and small diameter disks such that a lock craw mounted on each of the first arms releases the lock state of the second arms when the first arms are opened wide by the large diameter disk, and that the lock claw regulates the motion of the second arm when the large diameter disk passes the first arms to close the first arms, the improvement wherein:

an elongated hole of a third arm with a pin engagable with an elongated hole formed in the chassis couples with the disk position aligning pin mounted on one of the second arms;

as the large diameter disk is loaded, the motion of the second arms is transmitted via the third arm to a slider;

as the small diameter disk is loaded, the small diameter disk pushes a pin mounted on the third arm to rotate the third arm, the motion of the third arm being transmitted to the slider; and the motion of the slider activates a power transmission mechanism which transmits power of a loading motor to a disk clamping mechanism and a driving mechanism for driving a loading roller supporting lever.

In the loading mechanism for an optical disk player, the power transmission mechanism uses as a power transmission gear a planet gear supported by a swingable arm.

In the loading mechanism for an optical disk player, the power transmission mechanism drives a mechanism for locking a mechanical deck held in a floating state by elasticity.

According to the loading mechanism for an optical disk player of the present invention, as the large diameter disk is loaded, the first arms are opened wide to release the lock state of the second arms. As a result, the second arms rotate to retract the disk position aligning pins mounted on the second arms to determine the position of the large diameter disk.

The motion of one of the second arms is transmitted via the third arm to the slider. The motion of the slider enables power of the loading motor to transmit to the disk clamping mechanism and loading roller support lever, to thereby clamp the disk and complete the loading operation by detaching the loading roller from the disk.

When the small diameter disk is loaded, the lock state of the second arms is not released, so that the second arms remain still and the disk position aligning pins on the second arms determine the position of the small diameter disk.

The disk position aligning pin on one of the second arms serves as a fulcrum to rotate the third arm as the pin on the third arm pushes the small diameter disk. The motion of the third arm is transmitted to the slider. As a result, the motion of the slide enables power of the loading motor to transmit to the disk clamping mechanism and loading roller support lever, to thereby clamp the disk and complete the loading operation by detaching the loading roller from the disk.

DETAILED DESCRIPTION OF THE PREFERRED EMBODIMENTS

Figure 1A:
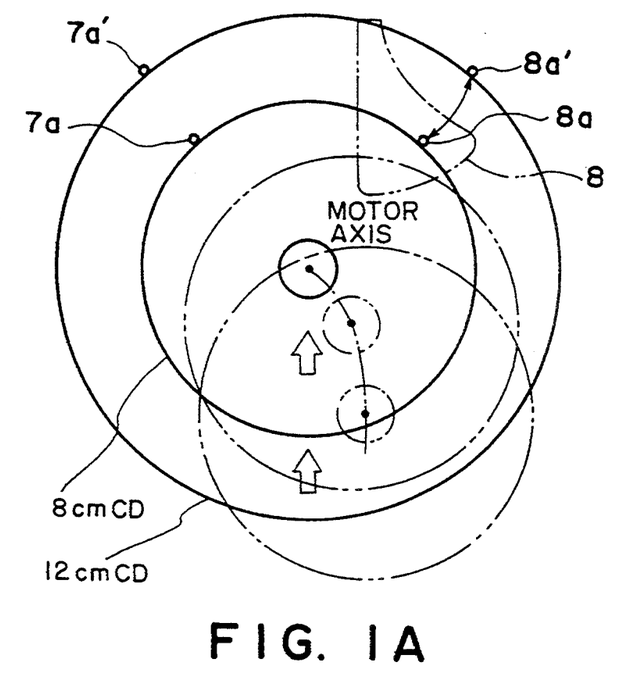
FIGS. 1A to 1D are schematic diagrams illustrating the operation of the loading mechanism according to an embodiment of the present invention.

First, the basics of the operation of the loading mechanism will be described with reference to FIGS. 1A to 1D. Referring to FIG. 1A, a 12 cm CD or 8 cm CD is loaded in a player (not shown) in the upward direction as viewed in FIG. 1A. The center of each disk is required to be aligned on the center of the motor shaft. Position aligning pins 7a and 8a for 8 cm CDs and position aligning pins 7a' and 8a' for 12 cm CDs are therefore disposed radially from the center of the motor shaft. The aligning pins 7a and 8a are used to detect the loading of an 8 cm CD, whereas the aligning pins 7a' and 8a' are used to detect the loading of a 12 cm CD. Each pair of two aligning pins disposed symmetrically and radially from the center of the motor shaft enables to guide a disk to the center of the motor shaft, even if it is loaded into the player shifting to the right or left from the center line of the player.

Figure 1B:
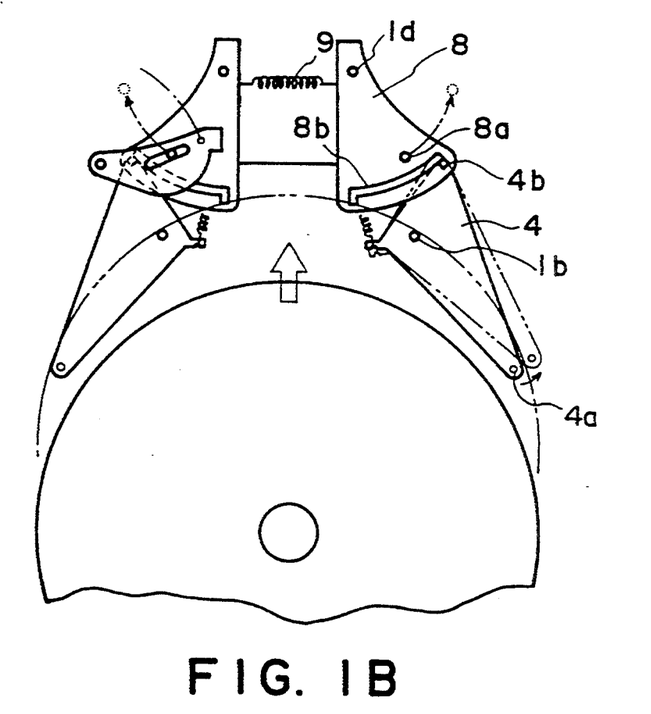

The operation of loading a 12 cm disk into the player in the upward direction as viewed in FIG. 1B will be first described. The circumferential edge of the disk at the position indicated by a solid line in FIG. 1B is not still in contact with a disk follower pin 4a of an arm 4b. A lock claw 4b of the arm 4 stays in a recess formed at one end of an arc groove 8b of an arm 8 so that the arm 8 in this condition will not rotate about its shaft 1d. As the disk is further inserted to the position indicated by a broken line, the circumferential edge of the disk becomes in contact with the disk follower pin 4a and pushes it upward to rotate the arm 4 in the counter-clockwise direction. The lock claw 4b then disengages from the recess of the arc groove 8b and allows the arm 8 to rotate in the counter-clockwise direction. However, at this position, the arm 8 will not still rotate because it is biased in the clockwise direction by a spring 9.

Figure 1C:
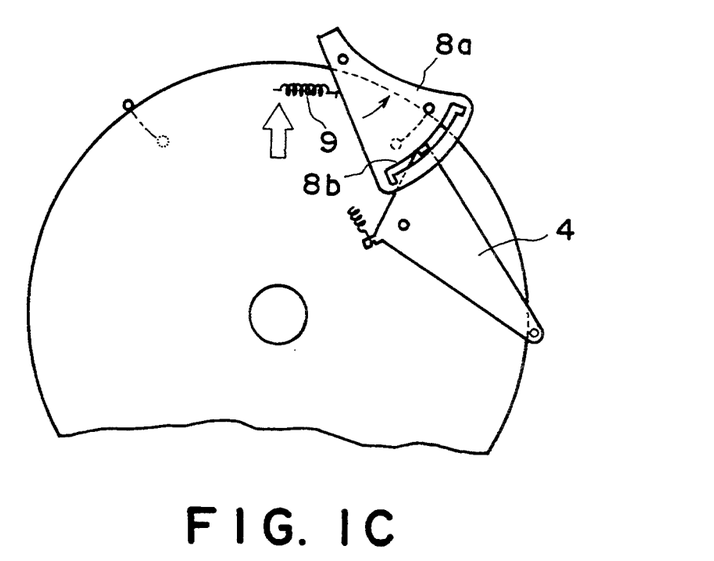

As shown in FIG. 1C, as the 12 cm disk is further inserted, the circumferential edge of the disk becomes in contact with the aligning pin 8a of the arm 8, and pushes the arm 8 upward to rotate it in the counter-clockwise direction against the biasing force of the spring 9. In this condition, the lock claw 4b of the arm 4 slides on the surface of the arc groove 8b. In this way, the aligning pin 8a moves gradually in the upward direction as viewed in FIG. 1C.

Figure 1D:
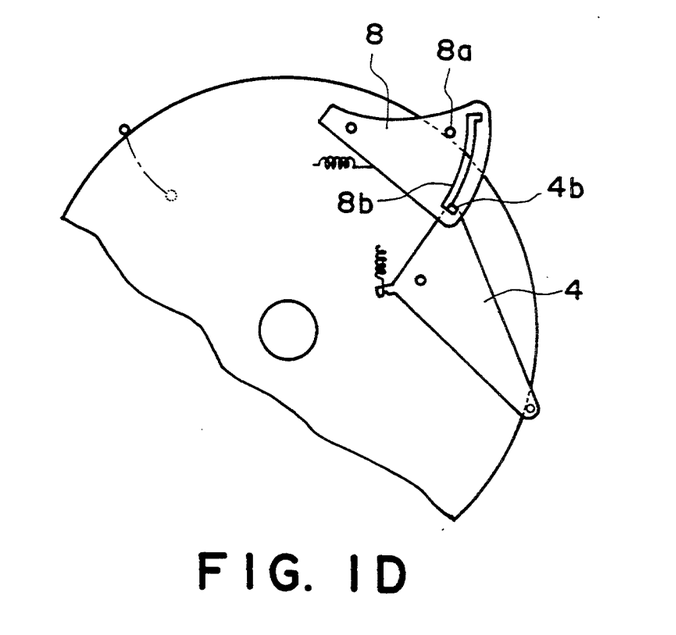

Referring now to FIG. 1D, as the disk further pushes the aligning pin 8a upward, the lock claw 4b of the arm 4 sliding on the arc groove of the arm 8 falls into another recess formed at the other end of the arc groove 8b. As a result, the rotation of the arm 8 is stopped and locked at this position. The position of the aligning pin 8a as well as its counterpart 7a define the loading completion position of the 12 cm disk. As will be later described, when the arm 8 takes the position shown in FIG. 1D, the insertion of the disk by means of a motor is stopped.

A 8 cm disk, on the other hand, is inserted until it contacts the aligning pin 8a of the arm 8 without contacting the disk follower pin 4a of the arm 4, that is, without releasing the lock state of the arm 8 with the arm 4. Because of this lock state of the arm 8, the 8 cm disk in contact with the aligning pin 8a will not rotate the arm 8 and is prevented from being further inserted.

In the above-described manner, the loading mechanism of the present invention can mechanically discriminate between 12 cm and 8 cm disks and stop them at correct positions by using the aligning pins mounted on the arm 8 in cooperation with the arm 4.

Figure 2:
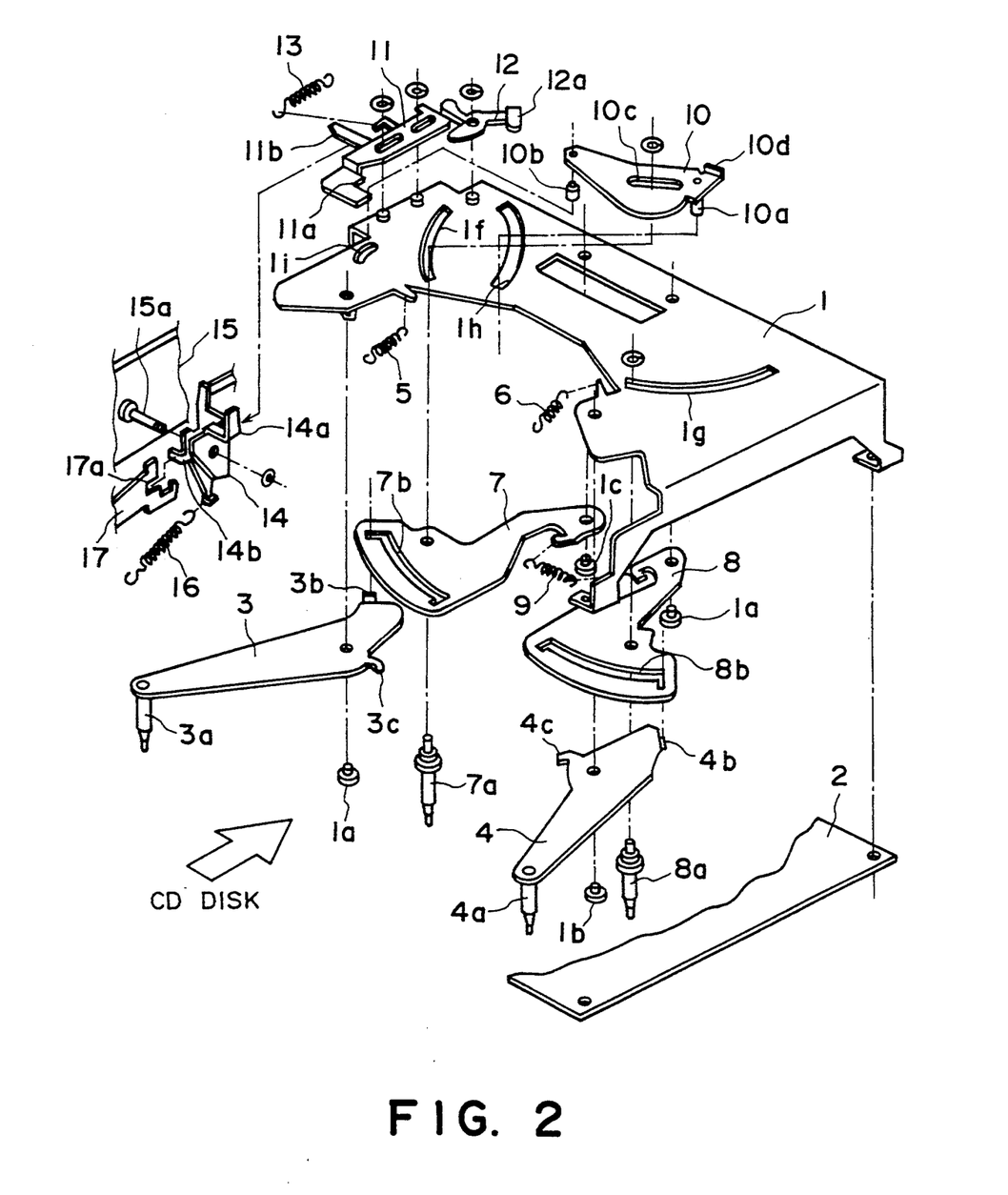
FIG. 2 is a broken perspective view showing part of the loading mechanism for optical disk players according to an embodiment of the present invention.

The details of the loading mechanism for optical disk players according to an embodiment of the present invention will be given below with reference to FIGS. 2 to 6. FIG. 2 is a broken perspective view showing part of the loading mechanism according to an embodiment. Reference numeral 1 represents an upper chassis of a mechanical deck of the disk player, the upper chassis 1 being fixedly mounted on a lower chassis 2 which supports an optical pickup feeding mechanism and spindle motor.

An arm 3 is rotatably supported via a shaft 1a on the upper chassis 1, and biased in the counter-clockwise direction by an extension spring 5 extending between the upper chassis 1 and a spring hook 3c. A disk follower pin 3a is fixedly mounted on the bottom surface of the arm 3 at its one end portion, the disk follower pin extending downward toward the motion path of a 12 cm disk. A lock claw 3b bent upward is formed at the other end portion of the arm 3.

An arm 4 symmetrical in shape with the arm 3 is rotatably supported via a shaft 1b on the upper chassis 1, and biased in the clockwise direction by an extension spring 6 extending between the upper chassis 1 and a spring hook 4c. A disk follower pin 4a is fixedly mounted on the bottom surface of the arm 4 at its one end portion, the disk follower pin extending downward toward the motion path of a 12 cm disk. A lock claw 4b bent upward is formed at the other end portion of the arm 4.

An arm 7 is rotatably supported via a shaft 1c on the upper chassis 1, and biased in the counter-clockwise direction by an extension spring 9. A disk aligning pin 7a is fixedly mounted on the arm 7, extending downward and upward from the surface of the arm 7. An arc groove 7b is formed in the arm, the groove having recesses formed at opposite ends thereof. The upper position of the aligning pin 7a is inserted in an arc guide 1f formed in the upper chassis 1. The lock craw 3b of the arm 3 is adapted to be inserted into the arc groove 1f.

An arm 8 is rotatably supported via a shaft 1d on the upper chassis 1, and biased in the clockwise direction by the extension spring 9. A disk aligning pin 8a is fixedly mounted on the arm 8, extending downward and upward from the surface of the arm 8. An arc groove 8b is formed in the arm, the groove having recesses formed at opposite ends thereof. The upper position of the aligning pin 8a is inserted in an arc guide 1g formed in the upper chassis 1. The lock craw 4b of the arm 4 is adapted to be inserted into the arc groove 1g.

An arm 10 disposed on the upper chassis 1 is formed with a slot 10c. Mounted on the arm 10 are pins 10a and 10b inserted in guide openings 1h and 1i formed in the upper chassis 1. The pin 10a is adapted to be pushed by an 8 cm disk as will be later described. The upper end of the disk aligning pin 7a is inserted in the slot 10c and retained by a stop ring.

A slider 11 is slidably supported by the upper chassis 1 by using elongated holes formed therein, and biased in the backward direction by an extension spring 13 extended between the slider and upper chassis 1. Engaging members 11a and 11b are formed extending outward from the right and left sides of the slider 11, the engaging member 11a engaging with the pin 10b of the arm 10.

Another arm 12 is rotatably supported on the upper chassis 1 via a shaft. The rotary position of the arm 12 is regulated by its right angle portion contacting one corner of the slider 11. An engaging member 12a formed at one end of the arm 12 becomes in contact with a projection 10d of the arm 10 when the arm 10 rotates.

A generally channel-shaped arm 14 is rotatably supported by a shaft 15a mounted on a frame 15, and biased in the clockwise direction by an extension spring 16 extended between the frame 15 and arm 14. An engaging member 14a of the channel-shaped arm 14 engages with an engaging member 11b of the slider 11, and a claw 14 of the channel-shaped arm 14 engages with a recess 17a of a lever 17.

The lever 17 is rotatably supported by the frame 15 which is in parallel with the lever 17. Another recess 17b is formed at the opposite side of the recess 17a, as shown in FIG. 3.

Figure 3:
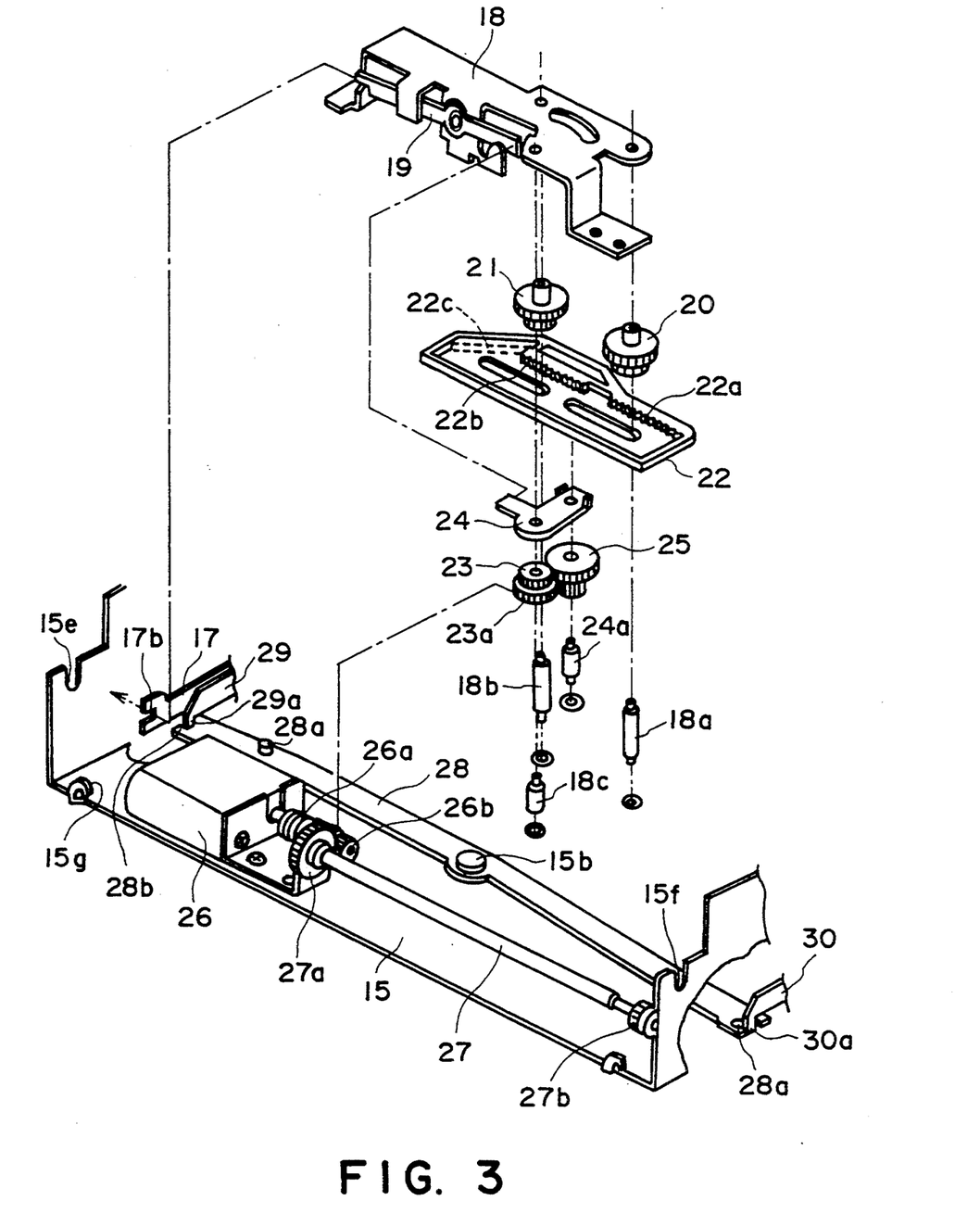
FIG. 3 is a broken perspective view showing part of the loading mechanism shown in FIG. 2.

A bracket 18 shown in FIG. 3 is fixedly mounted on the frame 15, and rotatably supports a lever 19. The leftmost side of the lever 19 engages with the recess 17b of the lever 17.

Shafts 18a and 18b mounted on the bracket 18 rotatably support gear sets 20 and 21, and slidably support a camplate 22. A small gear of the gear set 20 can mesh with a rack 22a of the cam plate 22, and a small gear of the gear set 21 can mesh with a rack 22b of the cam plate 22. A cam groove 22c is formed in the bottom wall of the cam plate 22.

A shaft 18c mounted on the bracket 18 rotatably supports a swingable arm 24 and sun gear 23. The swingable arm 24 and sun gear 23 contact together at their side faces. The lever 19 moves in and out of the motion path of the swingable arm 24.

A shaft 24a mounted on the swingable arm 24 rotatably supports a planet gear set 25 whose large gear can mesh with the sun gear 23 and whose small gear can mesh with large gears of the gear sets 20 and 21.

A worm wheel 23a integrally formed with the sun gear 23 meshes with a worm 26a fixed to the rotary shaft of a loading motor 26. A spur gear 26b is integrally formed with the worm 26a. The spur gear 26b meshes with a gear 27a which is fixedly attached to the leftmost end of a shaft 27 rotatably supported on the frame. A gear 27b is fixedly attached to the rightmost end of the shaft 27.

Mounted on a lever 28 rotatably supported by the frame 15 via a shaft 15b is a pin 28a engaging with the cam groove 22c of the cam plate 22. A recess 28b formed at the leftmost end of the lever 28 engages with a projection 29a formed on a left side cam plate 29 detailed in FIG. 4, whereas a recess 28c formed at the rightmost end of the lever 28 engages with a projection 30a formed on a right side cam plate 30.

Figure 4:
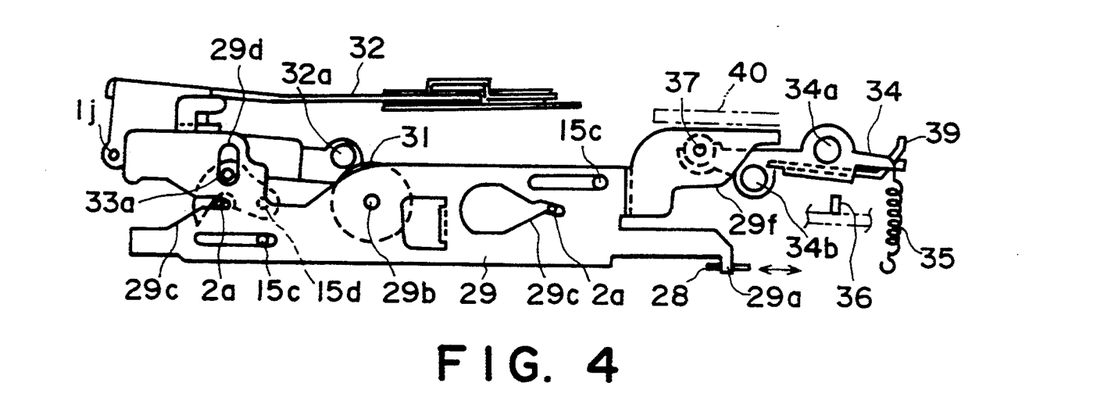
FIG. 4 is a side view showing part of the loading mechanism shown in FIG. 2.
Figure 5:
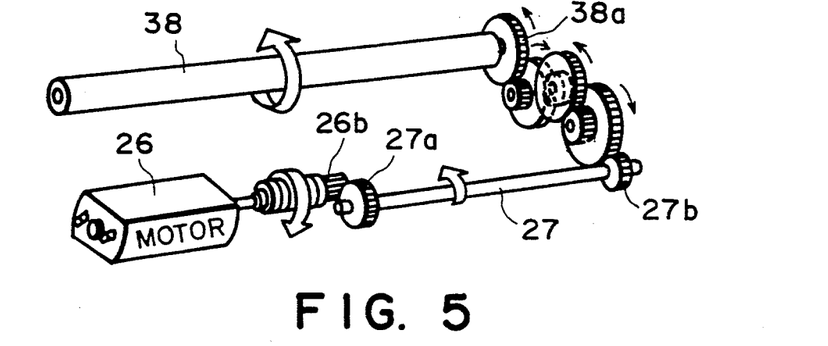
FIG. 5 is a perspective view showing part of the loading mechanism shown in FIG. 2.

As shown in FIG. 4, the left side cam plate 29 is slidably supported by pins 15c mounted on the frame 15. A shaft 29b mounted on the left side cam plate 29 rotatably supports a roller 31.

A clamp lever 32 rotatably supported on the lower chassis 2 by means of a shaft 1j is biased in the clockwise direction by a spring (not shown). A pin 32a mounted on the clamp lever 32 is pushed upward by the roller 31.

The lower chassis 2 is fixed to the frame 15 by a damper (not shown). Pins 2a mounted on the lower chassis 2 engage with the cams 29c of the left side cam plate 29. When the left side cam plate 29 moves to the right as viewed in FIG. 4, the mechanical deck becomes of a floating state. When the right side cam plate 30 moves in the opposite direction of the left side cam plate 29, the mechanical deck becomes of a floating state.

A projection 33a of a lock lever 33 rotatably supported by the frame 15 by a shaft 15d engages with a groove 29d of the left side cam plate 29. When the left side cam plate 29 moves to the left, the lock lever 33 rotates in the counter-clockwise direction to lock a pin 2c. When the left side cam plate 29 moves to the right, the lock lever rotates in the clockwise direction to release the lock state of the pin 2c.

A shaft 34a mounted on the left side of a channel-shaped roller lever 34 is rotatably supported in a recess 15e of the frame 15, and a shaft (not shown) mounted on the right side of the roller lever 34 is rotatably supported in a recess 15f of the frame 15. The roller lever 34 is biased in the clockwise direction by an extension spring 35 extended between the roller lever 34 and a spring hook 15g (FIG. 3) of the frame 15.

A pin 34b mounted on the roller lever 34 faces a slanted portion 29f of the left side cam plate 29. A micro switch 36 is fixedly mounted on a printed circuit board, the switch facing the bottom of the roller lever 34. A door 39 made of resin is attached to the roller lever 34, and a disk pressure 40 is disposed above the roller lever 34. The left proximal end of the roller lever 34 is supported by a bearing 37, the same structure being provided at the right distal end thereof.

These bearings 37 support a metal shaft of a rubber fixed to the shaft of the loading roller 38 is rotated by the gear 27b via a gear train mounted on the right side of the roller lever 34. The first gear of this gear train is mounted on the right side of the roller lever 34, and rotatably supported on a shaft which is supported in a recess 15f of the frame 15.

Figure 6:
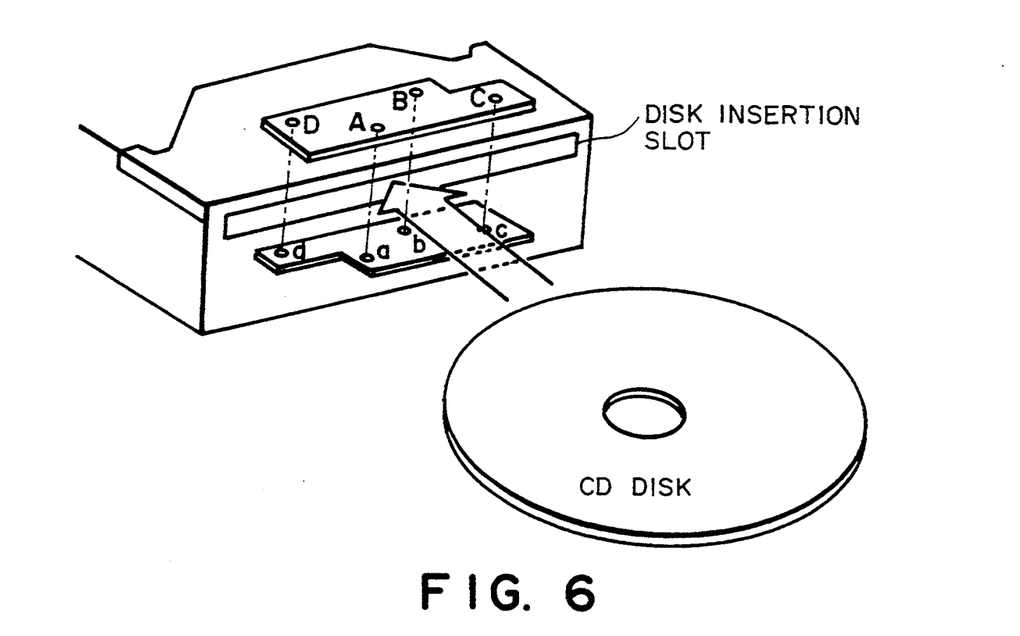
FIG. 6 is a perspective view showing part of an optical disk player mounted with the loading mechanism.

As shown in FIG. 6, light emitting diodes a, b, c, and d are provided at positions immediately at the back of and just under a disk insertion slot, and photosensors A, B, C, and D are also provided facing the light emitting diodes. The photosensor A detects an insertion of a disk, the photosensors B and D detect a discharge completion of an 8 cm CD, and the photosensor C detects a discharge completion of a 12 cm CD.

With the loading mechanism constructed as above, as shown in FIG. 6, as a CD is inserted into the disk insertion slot, the CD is detected with the photosensor A. Upon this detection, the loading motor 26 starts rotating in the direction indicated by an arrow in FIG. 5 to guide the CD into the loading mechanism.

At this initial condition, the left side cam plate 29 is located on the left side as viewed in FIG. 4, the pin 34b of the roller lever 34 is spaced apart from the slanted portion 29f, and the loading roller 38 pulls the CD inside the mechanism while pressing it with the disk pressing member 40.

When a 12 cm CD is loaded, the disk follower loading pins 3a and 4a shown in FIG. 2 are pushed backward so that the arms 3 and 4 are opened wide. Then, the lock states of the arms 7 and 8 are released, and as the CD is further loaded into the loading mechanism, the disk aligning pins 7a and 8a are pushed by the CD disk to expand the arms 7 and 8 wide.

When the CD departs from the disk follower pins 3a and 4a, the arms 3 and 4 are closed to lock the arms 7 and 8 at the respective rotary positions where the position of the CD is determined by the disk aligning pins 7a and 8a.

While the arm 7 rotates, the arm 10 is pushed by the disk aligning pin 7a and rotates in the counter-clockwise direction about the fulcrum of the pin 10b. At the final stage of this rotation, the projection 10d pushes the engaging portion 12a of the arm 12 to rotate it in the counter-clockwise direction. The arm 12 then moves the slider 11 to the lower left direction as viewed in FIG. 2 against the force of the extension spring 13.

When an 8 cm CD is loaded, the disk follower pins 3a and 4a shown in FIG. 2 will not contact the CD and the arms 3 and 4 remain still. As a result, the left side recess of the arc groove of the arm 7 remains engaged with the lock claw 3b, holding the arm 7 in the lock state. The arm 8 is also held in the lock state. Under this condition, the position of the CD is determined by the disk aligning pins 7a and 8a.

The radius of curvature of the circumferential edge of the 8 cm CD is smaller than that of the 12 cm CD. As a result, the distance extending outward from the disk aligning pins 7a and 8a is greater for the 8 cm CD than 12 cm CD. The pin 10a of the arm 10 is therefore pushed, and the arm 10 rotates in the counter-clockwise direction about the fulcrum of the disk aligning pin 7a. The pin 10b of the arm 10 moves the slider 11 in the lower left direction as viewed in FIG. 2 against the force of the extension spring 13.

As above, the slider 11 moves at the final stage of the disk loading, as any one of an 8 cm CD or 12 cm CD is loaded. The slider 11 causes the lever 19 shown in FIG. 3 to rotate in the clockwise direction, in cooperation with the channel-shaped arm 14 and lever 17. The swingable arm 24 having been intercepted by the lever 19 starts rotating in the clockwise direction. Specifically, because the gear 23 rotates in the clockwise direction by the loading motor 26, the swingable arm 24 is given a rotation force in the clockwise direction by friction.

As the swingable arm 24 rotates in the clockwise direction, the small gear of the gear set train 25 meshes with the large gear of the gear set 20. As the gear set 25 rotates, the camplate 22 is moved in the lower right direction to the distal end of the rack 22a. The lever 28 rotates in the counter-clockwise direction upon engagement of the campin 28a.

The left side cam plate 29 shown in FIG. 4 moves to the right to release the pins 2a, the same operation being provided for the right side cam plate 30. The roller 31 disengages from the pin 32a, and the clamp lever 32 rotates in the clockwise direction by the spring force, to thereby clamp the CD on the spindle motor turn table by using a clamper.

As the left side cam plate 29 moves to the right, the slanted portion 29f pushes the pin 34b down to rotate the roller lever 34 in the counter-clockwise direction. The loading roller disengages from the disk, and the door 39 closes the disk insertion slot. Then, the micro switch 36 is activated to become ready for the CD play.

When the disk is to be dismounted, the loading motor rotates in the direction opposite to that when loading a disk. The swingable arm 24 rotates in the counter-clockwise direction, the small gear of the gear set 25 mashes with the large gear of the gear set 21, and the cam plate 22 is fed in the upper left direction. The lever 28 rotates in the clockwise direction, and the left side cam plate 29 moves to the left as viewed in FIG. 4. The clamp lever rotates in the counter-clockwise direction to release the clamp state of the disk. The mechanical deck is then locked.

The roller lever 34 thereafter rotates in the clockwise direction to open the door. The loading roller contacts the disk to eject it out. The final stage of the disk discharge is detected with the photosensors B and D for the 8 cm CD, and with the photosensor C for the 12 cm CD. Upon detection of the disk discharge, the loading motor is stopped.

According to the loading mechanism for optical disk players of the present invention, the loading completion of large and small diameter disks can be mechanically detected without using expensive optical end sensors and electromagnetic plungers, to mechanically control the clamping operation and the like, reducing the manufacturing cost of the mechanism.

Furthermore, software for microcomputer can be simplified, improving the reliability of the mechanism.

What is claimed is:

1. A loading mechanism for setting one of large and small diameter disks on the same motor rotary shaft of an optical disk player of a type having a chassis and a power transmission mechanism which transmits power of a loading motor to a disk clamping mechanism and a driving mechanism for driving a loading roller supporting lever, said loading mechanism comprising:
    position aligning means having a pair of position aligning pins movable between first and second positions when one of said large and small diameter disks is set on said motor rotary shaft, said first position corresponding to two selected points on the circumferential edge of said small diameter disk, and said second position corresponding to two selected points on the circumferential edge of said large diameter disk;
    lock means for locking said pair of position aligning pins of said position aligning means selectively in one of said first and second positions;
    disk follower pin means having a pair of disk follower pins spaced apart by a distance equal to or larger than the diameter of said small diameter disk and equal to or smaller than the diameter of said large diameter disk, said disk follower pin means moving while said disk follower pins are in contact with the circumferential edge of said large diameter disk when said large diameter disk is inserted so that said lock means releases the locking of said position aligning means in the first position and then locks said position aligning means in the second position:
    an arm rotatably mounted on the chassis, said arm having a pin mounted thereon and an elongated hole in said arm for engagement with at least one of said position aligning pins mounted on one of said disk follower pin means, and
    a slider positioned for movement with said arm for activating the power transmission mechanism when said slider is moved by said arm;
    wherein as said large diameter disk is further inserted, the circumferential edge of said large diameter disk comes in contact with said pair of position aligning pins of said position aligning means to move said position aligning means, and when said pair of position aligning pins move from said first position to said second position, said disk follower pins control said lock means to lock said position aligning means, with the motion of said disk follower pin means transmitted via said arm to said slider to activate the power transmission mechanism;
    and wherein as said small diameter disk is loaded, said small diameter disk pushes said pin mounted on said arm to rotate said arm, the motion of said arm being transmitted to said slider to activate the power transmission mechanism.

2. In a loading mechanism for an optical disk player wherein first arms each having a pin extending toward a motion path of a large diameter disk are rotatably and symmetrically mounted on a chassis and biased by a spring, second arms each having a disk position aligning pin extending toward motion paths of said large diameter disk and a small diameter disk are rotatably and symmetrically mounted on said chassis and biased by a spring, and said disk position aligning pins determine the position of one of said large and small diameter disks such that a lock claw mounted on each of said first arms releases the lock state of said second arms when said first arms are opened wide by said large diameter disk, and that said lock claw regulates the motion of said second and when said large diameter disk passes said first arms and said first arms are closed, the improvement wherein:

an elongated hole of a third arm rotatably mounted on said chassis engages with the disk position aligning pin mounted on one of said second arms;

as said large diameter disk is loaded, the motion of said second arms is transmitted via said third arm to a slider;

as said small diameter disk is loaded, said small diameter disk pushes a pin mounted on said third arm to rotate said third arm, the motion of said third arm being transmitted to said slider; and the motion of said slider activates a power transmission mechanism which transmits power of a loading motor to a disk clamping mechanism and a driving mechanism for driving a loading roller supporting lever.

3. A loading mechanism for an optical disk player according to claim 2, wherein said power transmission mechanism uses as a power transmission gear a planet gear supported by a swingable arm.

4. A loading mechanism for an optical disk player according to claim 3, wherein said power transmission mechanism drives a mechanism for locking a mechanical deck held in a floating state by elasticity.

* * * * *